United States Patent [19]
Golata et al.

[11] Patent Number: 4,927,347
[45] Date of Patent: May 22, 1990

[54] COMPRESSION MOLD FOR FIBER-REINFORCED COMPOSITE WHEELS

[75] Inventors: John H. Golata; James A. Woelfel, both of Lansing, Mich.

[73] Assignee: Motor Wheel Corporation, Lansing, Mich.

[21] Appl. No.: 255,445

[22] Filed: Oct. 11, 1988

[51] Int. Cl.$^5$ .................. B22C 9/28; B29C 43/04
[52] U.S. Cl. ...................... 425/150; 249/56; 249/161; 264/40.5; 425/330; 425/441; 425/451; 425/454
[58] Field of Search ............. 425/441, 450.1, 451, 425/438, 454, 380, 150; 249/162, 56, 160, 161; 264/40.5

[56] References Cited

U.S. PATENT DOCUMENTS

| | | | |
|---|---|---|---|
| 3,193,884 | 7/1965 | Haynie et al. | 249/57 |
| 3,762,677 | 10/1973 | Adams | 249/56 |
| 3,956,451 | 5/1976 | Adams | 264/45.5 |
| 4,008,031 | 2/1977 | Weber | 425/242 R |
| 4,017,239 | 4/1977 | O'Connell et al. | 425/175 |
| 4,251,476 | 2/1981 | Smith . | |
| 4,294,639 | 10/1981 | Woelfel et al. | 156/185 |
| 4,376,749 | 3/1983 | Woelfel | 264/258 |
| 4,502,659 | 3/1985 | Stephonson et al. | 249/66 R |
| 4,583,933 | 4/1986 | Woelfel et al. | 425/330 |
| 4,786,027 | 11/1988 | Stalter, Sr. | 249/56 |

FOREIGN PATENT DOCUMENTS 62-162512  7/1987  Japan .................. 425/330

Primary Examiner—Jay H. Woo
Assistant Examiner—K. P. Nguyen
Attorney, Agent, or Firm—Barnes, Kisselle, Raisch, Choate, Whittemore & Hulbert

[57] ABSTRACT

A compression mold for manufacture of a fiber-reinforced composite vehicle wheel that has a circumferential array of radially reciprocable rim mold sections, a lower disc mold section affixed to a mold base, and an upper disc mold section axially reciprocable with respect to the lower disc mold section from an upper or retracted position to a lower or closed position in which opposing surfaces of the various mold sections form a wheel mold cavity. The radially reciprocable rim mold sections are slidably mounted on a retainer which is carried by springs above the mold base surrounding the lower disc mold section and are engaged by the upper disc mold section during downward motion of the latter so that the upper disc mold section and the rim mold sections move conjointly with respect to the lower disc mold section toward the closed cavity-defining position of all mold sections.

3 Claims, 6 Drawing Sheets

COMPRESSION MOLD FOR FIBER-REINFORCED COMPOSITE WHEELS

The present invention is directed to vehicle wheels of fiber-reinforced composite construction, and more particularly to an improved compression mold for manufacturing such wheels.

BACKGROUND OF THE INVENTION

A typical compression mold for manufacture of fiber-reinforced composite vehicle wheels in accordance with the prior art includes a lower disc mold section affixed to a stationary base, an upper disc mold section coupled to a ram for axial reciprocation with respect to the lower disc mold section, and a plurality of rim mold sections carried by the base for radial reciprocation in a fixed plane toward and away from the axis of the upper and lower disc mold sections. When the rim mold sections and the upper disc mold section are reciprocated to their respective closed positions, opposing surfaces of the several mold sections define a mold cavity for compression-forming an integral vehicle wheel, including a central disc portion for mounting the wheel to a vehicle and an annular rim portion for carrying a vehicle tire. In use, a mold charge of fiber-reinforced composite is placed on the upper face of the lower disc mold section, and the remaining mold sections are closed and maintained under heat and pressure. Mold charge material flows as the mold sections are closed into peripheral portions of the mold cavity. It is difficult to control fiber orientation during flow of material into the cavity edges. In wheels having integral bead-retaining flanges at one or both edges of the rim, absence of fiber orientation control can lead to fatigue crack formation at the juncture of the flange and rim base.

U. S. Pat. No. 4,583,933 assigned to the assignee hereof discloses an improved compression mold for composite wheels in which the rim mold segments are radially reciprocable in a fixed plane, and in which both the upper and lower disc mold segments are axially reciprocable with respect to the rim mold segment plane. The axially reciprocable lower disc mold segment permits fiber-reinforced mold charge material to be placed in the flange-forming portions of the mold cavity prior to closure of the mold segments, as distinguished from urging the mold charge material to flow into the flange-forming sections of the mold cavity as in the previous art. The mold construction so disclosed permits enhanced control of fiber orientation in the rim flange area, with consequent improved reliability and operating life in the resulting wheels. However, the mold disclosed in the noted patent requires construction of a special die to permit reciprocation of the lower mold section.

OBJECTS AND SUMMARY OF THE INVENTION

It is a general object of the present invention to provide an improved compression mold for fiber-reinforced composite vehicle wheels in which advantages of the mold in the noted patent are retained—i.e., placement of mold material in the rim flange portions of the mold cavity prior to mold closure rather than forced flow of material into the rim flange cavity portions — but which is less expensive to manufacture and assemble. In particular, it is an object of the present invention to provide a compression mold of the described character in which two of the three mold sections — i.e., the rim mold section and the upper and lower disc mold sections — are movable with respect to the third mold section, and which permits use of a standard die mechanism in which such third mold section constitutes a fixed lower disc mold section.

A compression mold for fiber-reinforced composite vehicle wheels in accordance with the present invention comprises axially opposed disc mold sections and a circumferential array of rim mold sections. The lower disc mold section is fixedly carried by a stationary die base, and the upper disc mold section is coaxially reciprocable with respect thereto. The circumferential array of rim mold segments is carried on a retainer for radial reciprocation with respect to the central axis of the mold, and the retainer is carried for axial reciprocation with respect to the fixed lower disc mold section. The upper disc mold section includes means for axial abutting engagement with the rim mold sections for thereby axially reciprocating the rim mold sections conjointly with the upper disc mold section.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The disclosure of U. S. Pat. No. 4,583,933, identified above, is incorporated herein by reference for its description of preparation of disc and rim mold charges for composite wheels in accordance with a preferred implementation of the present invention, and also for its description of basic principles of compression mold operation. Such basic principles of mold operation and formation of rim and disc mold charges will only be summarized in the following text as required to describe construction and operation of the improved mold embodiments of the present invention.

Figure 1A:
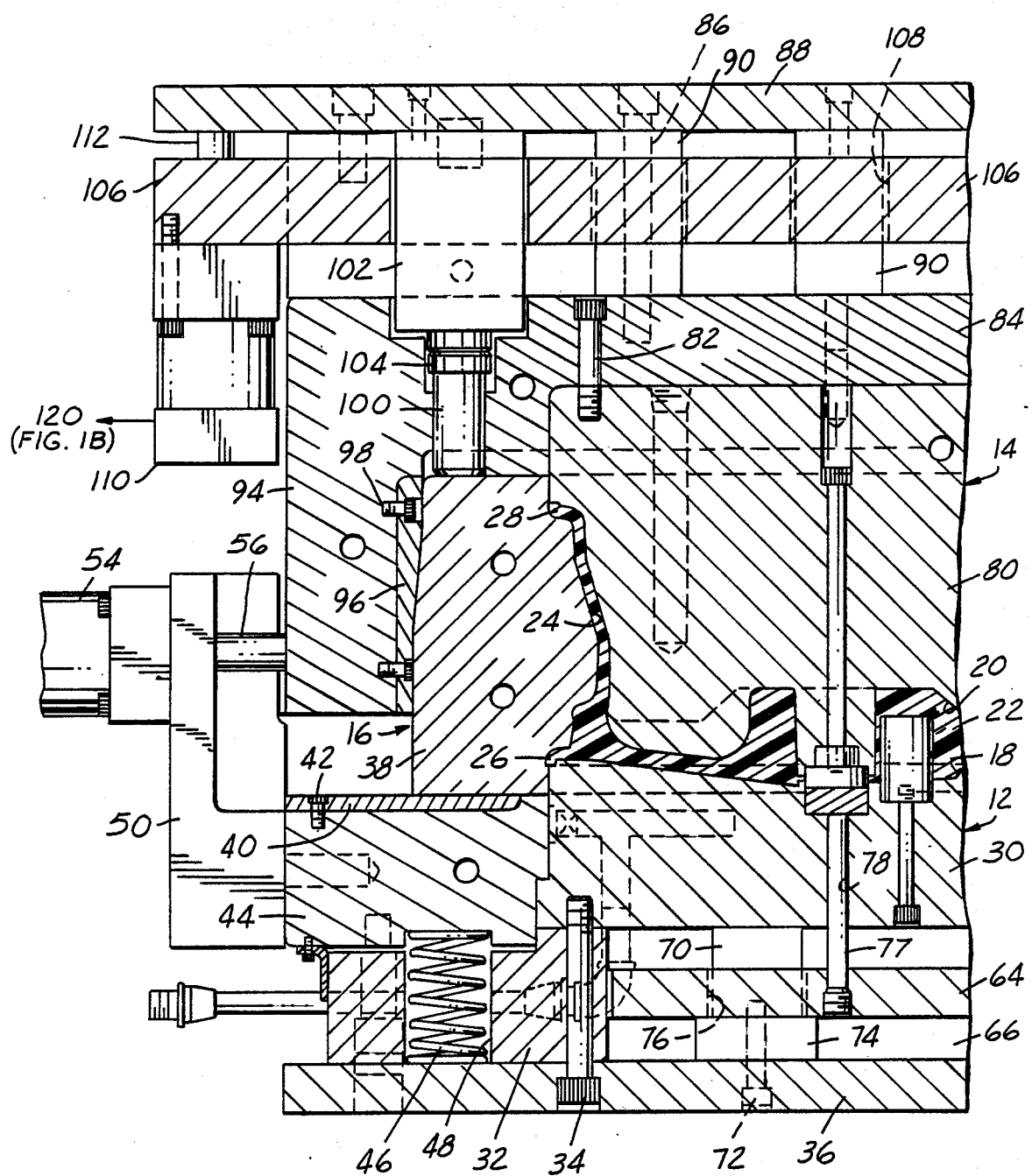
FIGS. 1A and 1B together comprise a sectional view in side elevation diametrically bisecting a compression mold in accordance with a presently preferred embodiment of the invention, the mold being shown in the fully closed position.
Figure 1B:
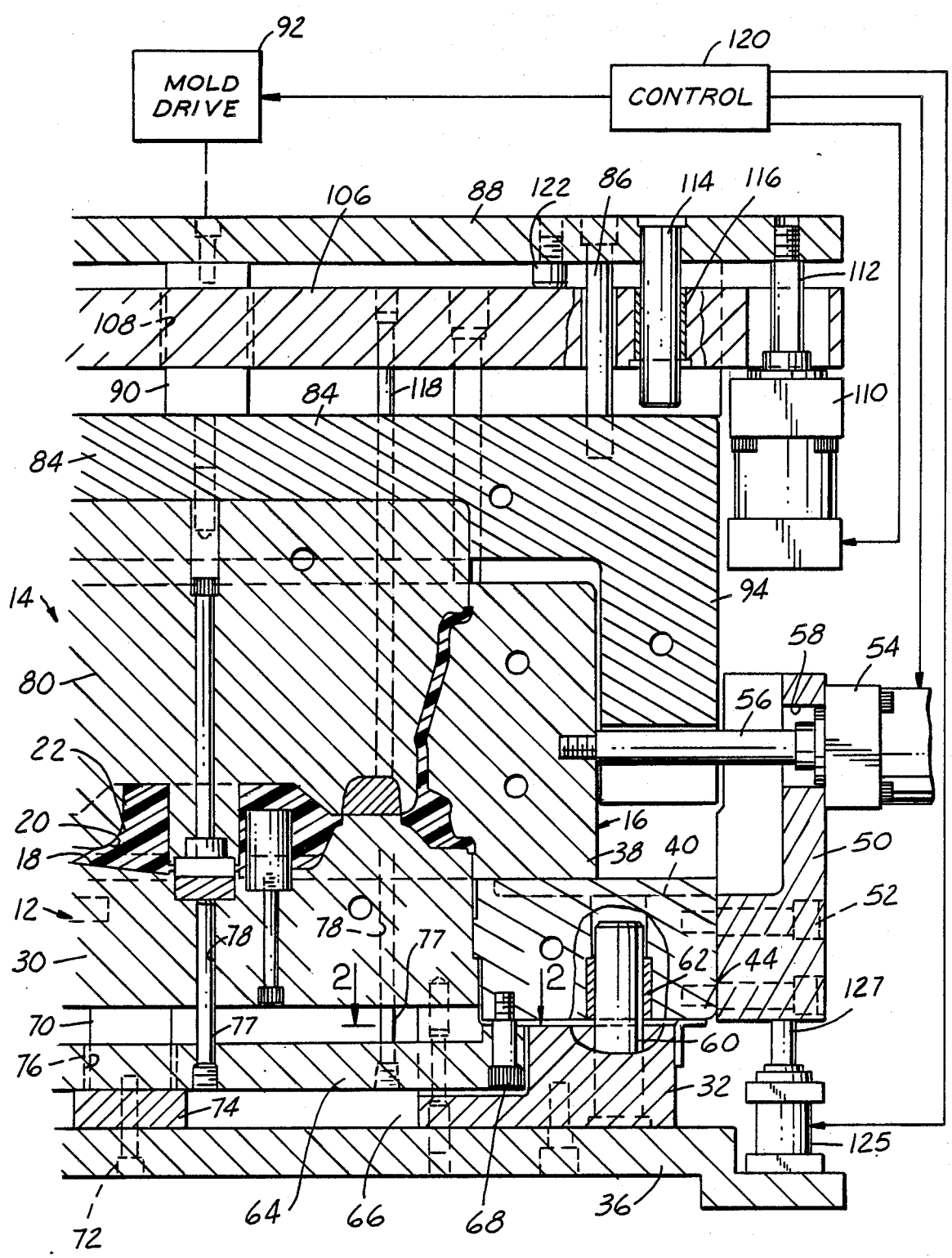
Figure 2:
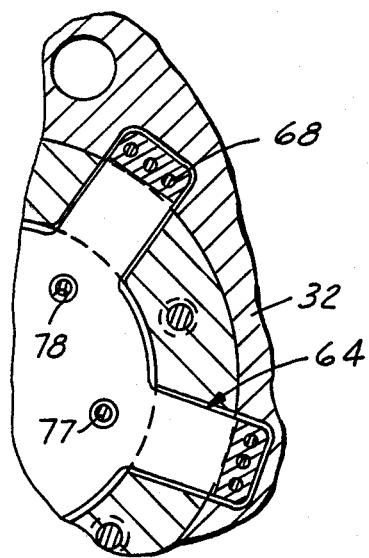
FIG. 2 is a fragmentary sectional view taken substantially along the line 2—2 in FIG. 1B.

FIGS. 1A, 1B and 2 illustrate a compression mold 10 in accordance with a presently preferred embodiment of the invention as comprising a lower disc mold section 12, an upper disc mold section 14 (the adjectives "upper" and "lower" being employed for descriptive purposes only) and a circumferential rim mold section 16. Disc mold sections 12,14 have opposed surfaces 18,20 which, in the closed position of mold 10 illustrated in FIGS. 1A, 1B and 2, define the disc-forming portion of a mold cavity 22. The generally radially inwardly facing surface 24 of rim mold section 16 cooperates with opposing portions of surfaces 18,20 on disc mold sections 12,14 in the closed position of the mold sections to define the rim-forming portion of cavity 22. It will be noted in particular in FIGS. 1A and 1B that the rim-forming position of mold cavity 22 includes segments 26,28 for formation of outboard and inboard bead-retaining flanges on the resulting integral fiber-reinforced rim and disc structure.

Lower disc mold section 12 comprises a cavity insert 30, having the cavity-defining upper surface 18, mounted by an annular spacer plate 32 and by the bolts 34 to a fixed base 36. Rim mold section 16 includes a circumferential array of rim mold segments 38 having inner surfaces which collectively define rim mold surface 24. Segments 38 are slidably mounted on wear pads 40 which are affixed by screws 42 (FIG. 1A) on the upper axially-facing surface of a retainer 44. A circumferential array of coil springs 46 (FIG. 1A) are positioned within corresponding bores 48 in plate 32 and are captured in compression between retainer 44 and base 36 thereby resiliently to support retainer 44 above base 36. Brackets 50 are affixed by bolts 52 (FIG. 1B) to the outer periphery of retainer 44 and extend upwardly from base 36. Hydraulic cylinders 54 are externally mounted on brackets 50 and have actuator rods 56 which extend through apertures 58 in brackets 50 and are affixed to rim mold segments 38. A plurality of pins 60 (FIG. 1B) extend upwardly from plate 32 through sleeve bearings 62 in retainer 44 for restraining and guiding axial motion of retainer 44 with respect to plate 32 and base 36. An array of cylinders 125 (FIG. 1B) are carried by base 36 and have rods 127 which engage retainer 44 to assist lifting of the same as the mold is opened.

A core ejector plate 64 is positioned in the cavity 66 between insert 30 and base 36. Plate 64 is suspended about its periphery from retainer 44 and is fastened thereto by the bolts 68 (FIG. 1B). Plate 64 thus moves axially of base 36 conjointly with rim-segment support retainer 44. Pillars 70 are fastened to base 36 by bolts 72 and spacers 74, and extend through apertures 76 in plate 64 for centrally supporting mold insert 30. Spacers 74 have a greater diameter than do apertures 76 and thereby collectively function as an abutment stop against downward motion of retainer 44 toward base 36. A plurality of ejector pins 77 are affixed to plate 64 and extend upwardly therefrom slidably through corresponding passages 78 in insert 30. In the fully closed position of mold 10 (FIGS. 1A–1B), the upper ends of pins 77 are positioned within insert 30 beneath cavity surface 18.

Upper disc mold section 14 includes a mold cavity insert 80 affixed by bolts 82 beneath an insert retainer 84. The axial and radial surfaces of insert 80 define cavity surface 20. Retainer 84 is suspended by bolts 86 from a top plate 88, spacer pillars 90 being clamped therebetween. Top plate 88 is coupled to a mold drive 92, such as a hydraulic ram, for axial reciprocal motion with respect to lower disc die section 12. A flange 94 integrally depends from retainer 84 and has wear pads 96 (FIG. 1A) affixed by screws 98 to the radially inwardly oriented face thereof for abutting and clamping engagement with the opposing faces of rim mold segments 38. A circumferential array of abutment pins 100 (FIG. 1A) are slidably carried by retainer 84 above mold segments 38. A plurality of gas springs 102 are carried by top plate 88 and respectively engage pins 100 to urge the same downwardly toward segments 38, each pin 100 having an enlarged head 104 for retaining the same on retainer 84.

An upper ejector plate 106 is positioned between top plate 88 and retainer 84, plate 106 having openings 108 which surround pillars 90. A pair of hydraulic cylinders 110 depend from diametrically opposed edges of plate 106 and have actuator rods 112 coupled to top plate 88. A circumferential series of pins 114 (FIG. 1B) depend from top plate 88 through sleeve bearings 116 in plate 106 for guiding motion of plate 106 with respect to plate 88. A plurality of ejector pins 118 (FIG. 1B) depend from plate 106 and slidably extend through retainer 84 and insert 80 to a position adjacent to surface 20 in the closed position of mold 10. Cylinders 54, 110, 125 and drive 92 are coupled to an appropriate control mechanism 120 (FIG. 1B) for coordinating motion in the manner to be described. Buttons 122 on top plate 88 form an abutment stop for plate 106.

Figure 3:
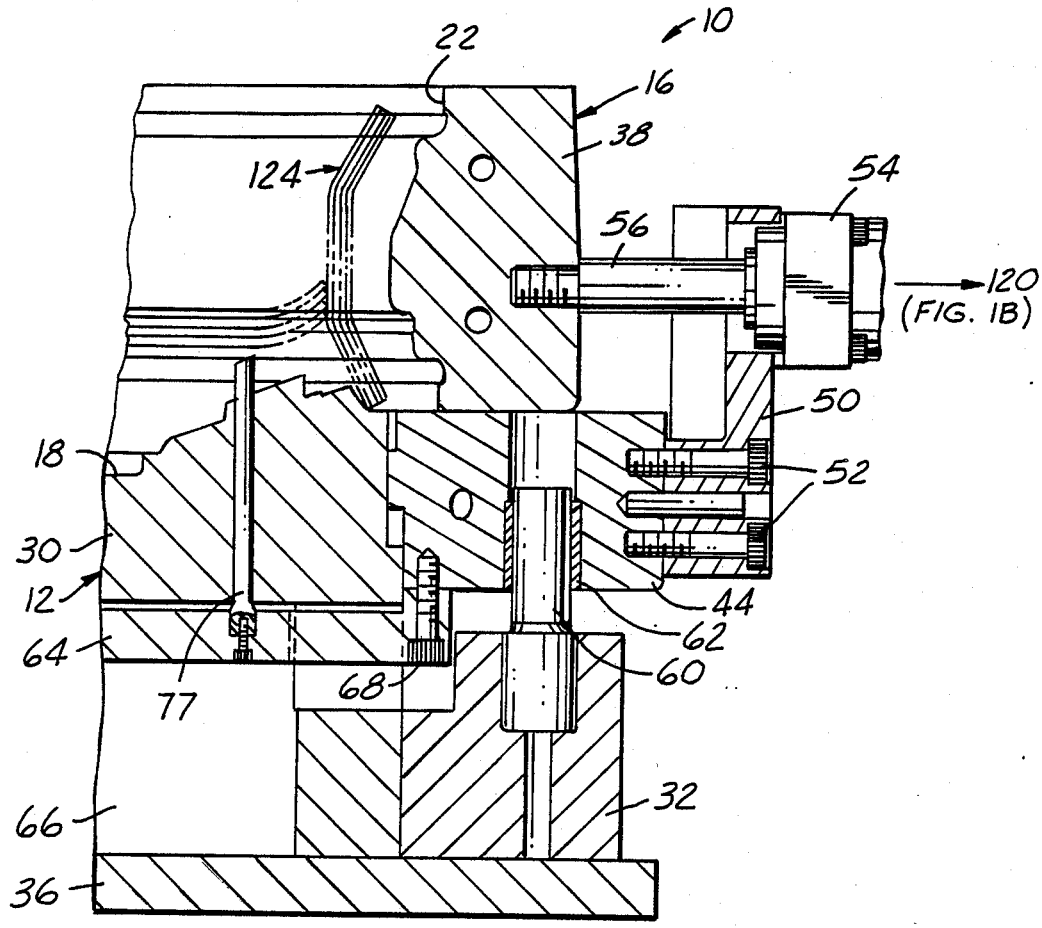
FIGS. 3 and 4 are fragmentary sectional views in side elevation respectively showing the mold of FIG. 1 in the fully open and partially closed positions respectively.

In operation, the initial position of mold 10 is illustrated in FIG. 3 (with upper disc mold section 14 being displaced upwardly and not illustrated). Retainer 44 is spaced upwardly from base 36 by springs 46 (FIG. 1A), and lower ejector plate 64 is adjacent to the lower surface of insert 30. Ejector pins 77 extend above cavity-forming surface 18 of insert 30. Rim mold segments 38 are in a partially closed position on retainer 44, with rods 56 of cylinders 54 being partially extended. With the mold thus positioned, a rim mold charge 124 and a disc mold charge 126, both preferably formed in accordance with the principles of U. S. Pat. No. 4,583,933 noted above, are placed on lower mold section 12. Rim mold section 16 is then fully closed by actuation of cylinders 54 to displace mold segments 38 radially inwardly to the position of FIG. 4. In this position, rim mold segments 38 form a closed ring which circumferentially embraces rim mold charge 124 and disc mold charge 126, which still rests upon the upper ends of ejector pins 77. Thus, in the mold position of FIG. 4, rim mold section 16 is fully closed, but disc mold sections 12,14 are still open.

Upper disc segment 14 is then propelled downwardly through activation of drive 92 by control 120. As the upper disc die section is driven downwardly, pins 100 (FIG. 1A) engage the opposing surfaces of segments 38. Continued downward motion of upper die section 14 thus acts through gas springs 102 and pins 100 to urge rim mold segments 38 and support retainer 44 downwardly against the force of coil springs 46. As retainer 44 moves downward, lower ejector plate 64 is correspondingly carried downward and pins 77 are retracted flush to the surface 18 of insert 30. After plate 64 bottoms out against spacers 74, further downward motion of upper mold section 14 results in lost motion with respect to pins 100, and brings retainer flange 94 into embracing engagement with segments 38. Mold 10 is thus in the fully closed position of FIGS. 1A and 1B, and is maintained in this condition under pressure from drive 92 and elevated temperature for a time sufficient to compression mold and cure the mold charge into a vehicle wheel.

Figure 4:
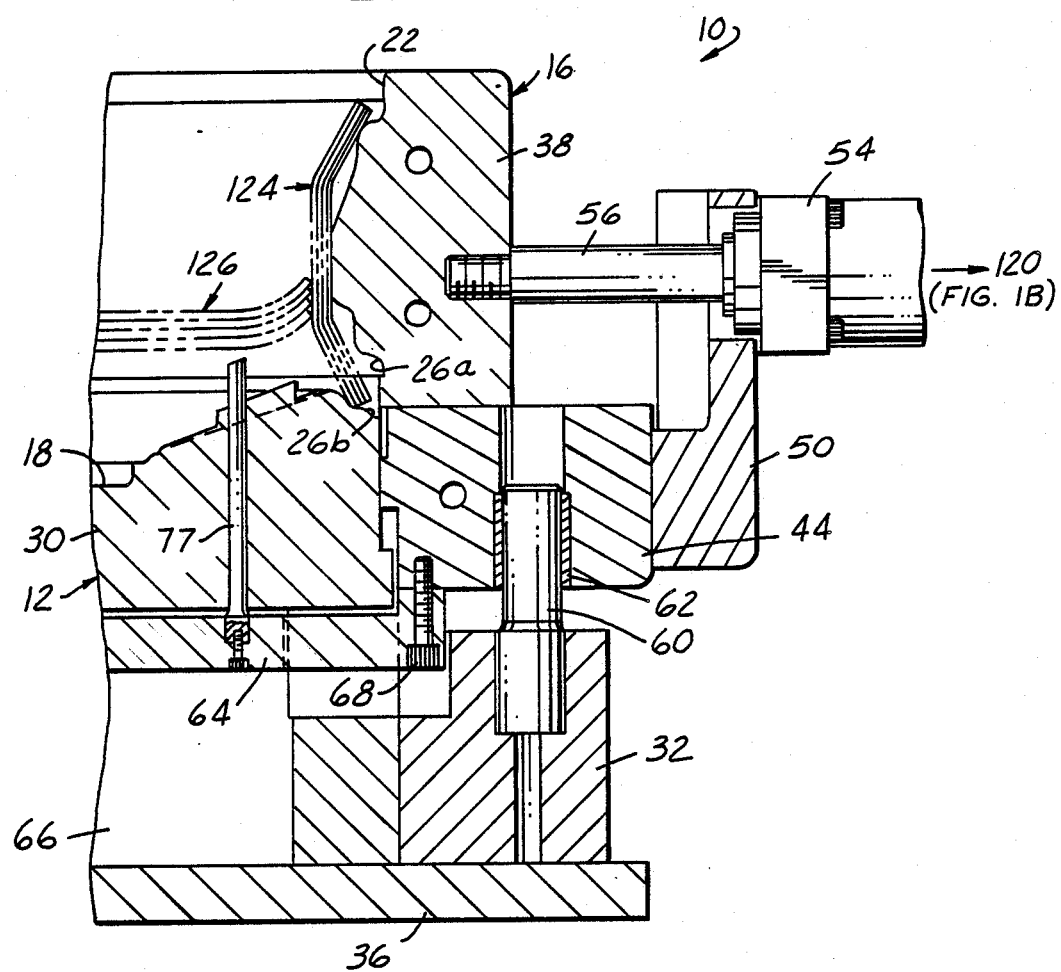

It will be noted in FIG. 4 that the surface portions 26a and 26b of rim mold segment 38 and lower disc mold insert 30, which define the outboard flange-forming portion of mold cavity 22 (FIGS. 1A and 1B), are initially displaced axially from each other, permitting placement of the lower edge of rim mold charge 124 therebetween when the mold is open. Thus, as the mold closes and surface portion 26a moves axially toward portion 26b to form the flange-defining portion 26 of mold cavity 22, little material flow of rim charge 124 is required to fill that portion of the mold cavity. Enhanced control of fiber orientation in the edge portions of rim charge 124 is thereby obtained, decreasing likelihood of crack formation and increasing wheel operating life as noted above.

After a time suitable for compression molding and curing of the vehicle wheel, upper mold section 14 is retracted upwardly by drive 92 and control 120 (FIG. 1B). Retainer flange 94 releases segments 38 from radial embracement. Springs 102 and pins 100 then permit springs 46 to displace retainer 44 and plate 64 upwardly. The formed wheel, which is still radially embraced by rim mold segments 38, moves upwardly with segments 38 and retainer 44. Ejector pins 77 help break the outboard surface of the wheel disc from surface 18 of insert 30. Cylinders 125 are activated to help break any mold flash at the edge of the lower bead flange. When upper mold section 14 is fully retracted (FIG. 4), rim mold section 16 is then retracted (FIG. 3), and the formed wheel rests upon the upper ends of pins 77 ready for removal from the mold.

Figure 5A:
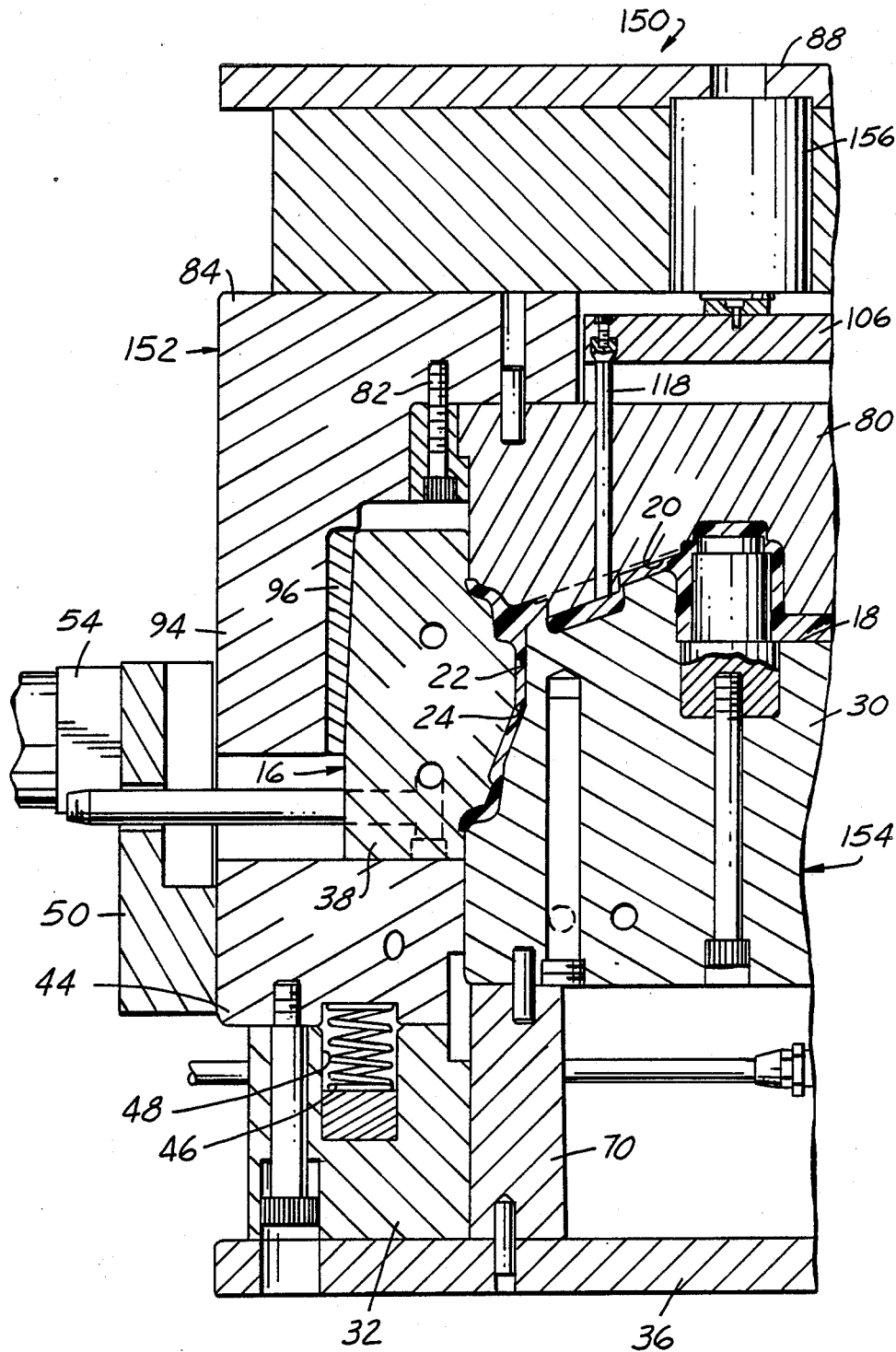
FIGS. 5A and 5B together comprise a sectional view in side elevation diametrically bisecting a compression mold in accordance with a modified embodiment of the invention.
Figure 5B:
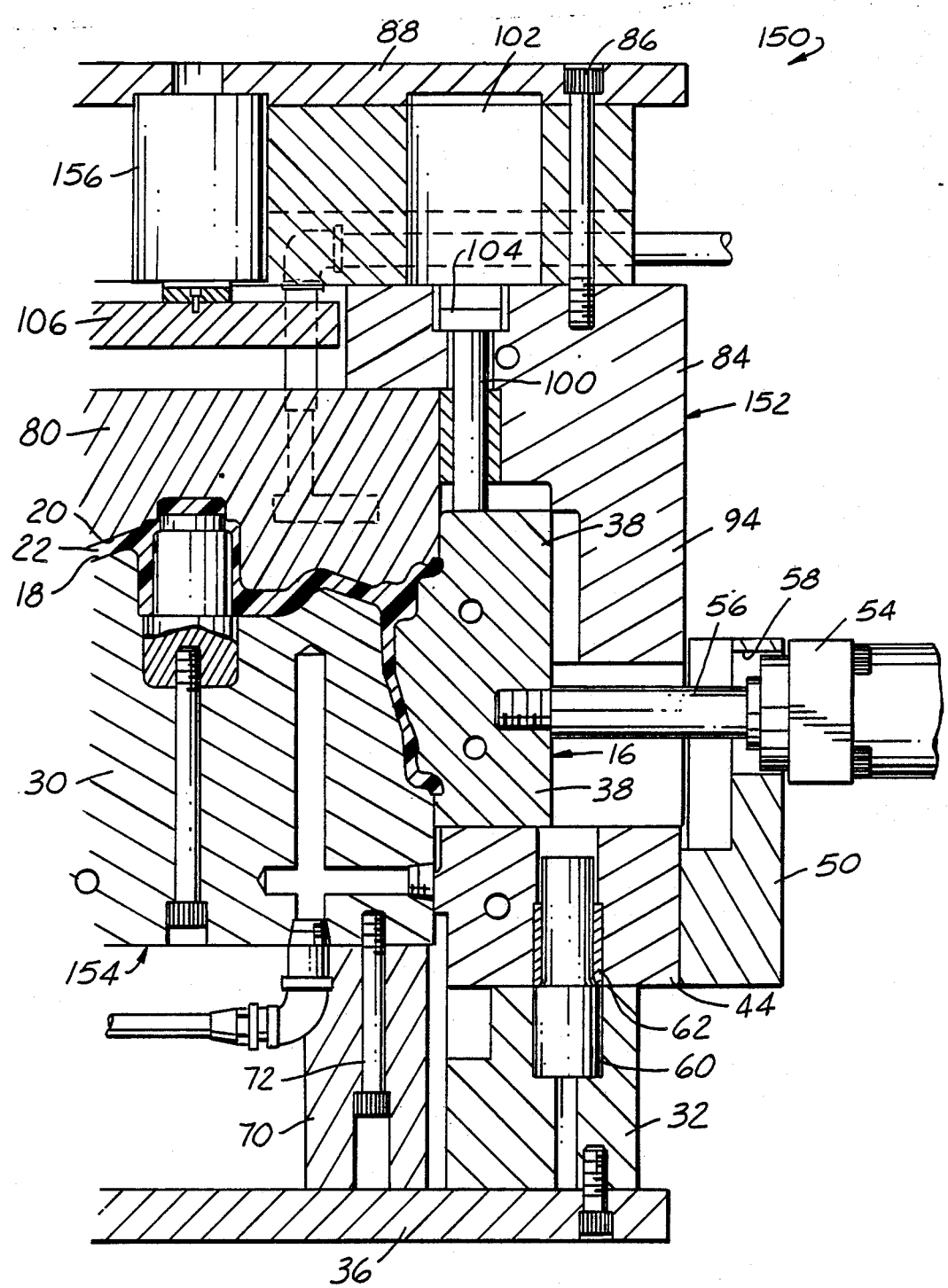

FIGS. 5A and 5B illustrate a modified mold 150 in which the wheel is molded face-up rather than face-down, which is to say that the upper disc mold segment 152 forms the outboard disc face and outboard bead-retaining flange, whereas the lower fixed disc mold section 154 forms the inboard disc face and inboard bead-retaining flange (in cooperation with rim mold section 16). Reference numerals in FIGS. 5A and 5B identical to those employed in FIGS. 1A–4 illustrate correspondingly identical or equivalent elements. One difference between mold 150 of FIGS. 5A and 5B and that previously discussed lies in the disposition of upper ejector plate 106 and coupling thereof to upper top plate 88 by the nitrogen springs 156 rather than by hydraulic cylinders 110 in FIGS. 1A–1B, whereby ejector plate 106 is automatically responsive to raising of top plate 88 by mold drive 92 for sliding pins 118 through corresponding bores in upper mold section 152 and thereby breaking the wheel from the upper disc mold face.

The invention claimed is:

1. A compression mold for forming a fiber-reinforced composite wheel including integral rim and disc portions with a bead retaining flange on at least one axial end of said rim portion, said mold comprising: first radially reciprocable mold sections having mold surfaces defining radially outward rim-forming surfaces of a mold cavity, second and third axially opposed mold sections having mold surfaces defining disc-forming portions of said mold cavity and cooperable with opposing surfaces of said first mold sections for forming portions of said rim including said flange, first means supporting said first mold sections for radial reciprocation relative to a central axis of said mold, second means mounting said second mold section in fixed position, third means mounting said third mold section for axial reciprocation between a first position adjacently opposed to said second mold section to form said mold cavity and a second position axially spaced from said second mold section, fourth means mounting said first means for axial reciprocation between a first position adjacently opposed to said second mold section to form said mold cavity and a second position axially spaced from said second mold section in the direction of said third mold section, said fourth means including means resiliently urging said first means to said second position, and means for reciprocating said first and third mold sections between said first and second positions relative to said second mold section, said reciprocating means including fifth means for radially reciprocating said first mold sections on said first means, and sixth means for axially reciprocating said third mold section toward said second mold section, said third means including means for axial abutting engagement said first means and axially reciprocating said first mold sections toward said second mold section conjointly with said third mold section against said resiliently-urging means.

2. A compression mold for forming a fiber-reinforced composite wheel including integral rim and disc portions with a bead-retaining flange at at least one axial end of said rim portion, said mold comprising:

first mold section means including first mold sections having mold surfaces defining radially outward rim-forming surfaces of a mold cavity, a retainer carrying said first mold sections for radial reciprocation, and means for reciprocating said first mold sections on said retainer between radially inner and outer positions with respect to a central axis of said mold, second mold section means including a second mold section having a mold surface cooperable with opposing positions of said first mold section surfaces for defining a rim-forming portion of said cavity, including a portion of said cavity for forming said at least one bead-retaining flange, means mounting said second mold section in fixed position, and means mounting said retainer for axial reciprocation with respect to said second mold section, and third mold section means including a third mold section having a mold surface cooperable with said surface of said second mold section for defining a disc-forming portion of said mold cavity and cooperable with opposing portions of said first mold section surfaces for defining a second rim-forming portion of said cavity, means mounting said third mold section for axial reciprocation with respect to said second mold section between a closed position forming said mold cavity and an open position, and means for engaging said first mold section means and axially reciprocating said first mold sections with respect to said second mold section conjointly with said third mold section.

3. In a compression mold for forming a fiber-reinforced composite vehicle wheel and comprising a first mold segment including rim mold sections radially reciprocable with respect to a central mold axis, and second and third mold segments respectively including opposed disc mold sections cooperable with said rim mold sections to form a mold cavity, said second mold segment being mounted in fixed position and said third mold segment being axially reciprocable with respect thereto, the improvement wherein said first mold segment includes means mounting said rim mold sections for axial reciprocation with respect to said second mold segment, wherein said third mold segment includes means for abuttingly engaging and reciprocating said first mold segment with respect to said second mold segment conjointly with said third mold segment, and wherein said mold further includes mold drive means coupled to said third mold segment to propel said third mold segment toward said second mold segment in a controlled continuous uninterrupted motion to engage said first mold segment and move said first and third mold segments conjointly to a closed position relative to said second mold segment.

* * * * *